United States Patent [19]

Adams et al.

[11] 3,933,191

[45] Jan. 20, 1976

[54] METHOD FOR CONTAINING THE MOLTEN REACTION PRODUCTS OF A REACTIVE CLADDING PROCESS

[75] Inventors: Richard C. Adams, Pitcairn Borough, Allegheny County; Robert H. Kachik, Washington Township, Westmoreland County; Arthur J. Pignocco, Franklin Township, Westmoreland County; Waldo Rall, Fox Chapel Borough, Allegheny County, all of Pa.

[73] Assignee: United States Steel Corporation, Pittsburgh, Pa.

[22] Filed: July 2, 1974

[21] Appl. No.: 485,193

Related U.S. Application Data

[62] Division of Ser. No. 332,869, Feb. 15, 1973, Pat. No. 3,856,076.

[52] U.S. Cl. .......................... 164/54; 164/DIG. 12
[51] Int. Cl.² .......................................... B23K 23/00
[58] Field of Search ......... 164/54, 53, 92, 332, 333, 164/334, 9, 10, 11, 98, DIG. 12; 228/198; 249/93

[56] References Cited
UNITED STATES PATENTS

| 13,050 | 12/1909 | Goldschmidt | 164/DIG. 12 |
| 1,298,373 | 3/1919 | Mott, Jr. et al. | 164/333 |
| 1,312,401 | 8/1919 | Huber | 164/54 X |
| 2,294,169 | 8/1942 | Francis et al. | 164/53 |
| 2,489,280 | 11/1949 | Flora et al. | 164/332 X |
| 3,264,696 | 8/1966 | Funk | 164/54 |
| 3,396,776 | 8/1968 | Funk | 164/54 |
| 3,421,570 | 1/1969 | Guntermann | 164/53 |
| 3,620,291 | 11/1971 | Delachapelle | 164/54 X |
| 3,633,866 | 1/1972 | Funk | 249/93 X |

FOREIGN PATENTS OR APPLICATIONS

| 469,352 | 11/1928 | Germany | 164/DIG. 12 |

*Primary Examiner*—Ronald J. Shore

[57] ABSTRACT

Method and apparatus for containing the molten reaction products of a reactive cladding process, such as an aluminothermic reduction cladding process, in which a refractory-lined perimeter rests on either a sand bed or a steel base. A second perimeter surrounding the inner perimeter and forming an annular space therewith is also situated on either the sand bed or the steel base. Sand placed in the annular space between the two perimeters chills any molten reaction products which escape the confines of the inner perimeter, preventing any spread of this material.

3 Claims, 2 Drawing Figures

METHOD FOR CONTAINING THE MOLTEN REACTION PRODUCTS OF A REACTIVE CLADDING PROCESS

This is a division, of application Ser. No. 332,869, filed Feb. 15, 1973, and now U.S. Pat. No. 3,856,076.

This invention relates to the cladding of metals and metal alloys to steel substrates by a reactive cladding process, such as the aluminothermic reduction (ATR) method, and more particularly to a method and apparatus for containing the reaction products of such a process.

Procedures for cladding metal and metal alloys to steel substrates by the aluminothermic reduction of metal oxide ores are well known. However, the containment of super-heated reaction products is an especially severe problem when cladding large substrates. We have found that cast ceramic perimeters which are used satisfactorily on small pilot plant scale cladding operations are cumbersome, unreliable and totally inadequate when scaled up to commercial sized applications.

The following prior art patents disclose molds for containing the molten ATR reaction products: U.S. Pat. Nos. Carpenter et al. 2,515,191; Burke 3,113,359; Funk 3,264,696; Funk 3,396,776; Guntermann 3,421,570.

Both of the Funk patents disclose molding sand for containing his molten reaction products. Burke requires packing to prevent leakage. Guntermann discloses no details of his mold 3. Carpenter's box 12 has a refractory lining 14 and an interior steel lining against and extending to the bottom of substrate 10. We have found that such a mold or containment apparatus allows the molten reaction products to move downwardly along the sides and ends of the substrate, coating not only the sides and ends but also washing out the sand beneath the substrate and forming irregular thin coatings on the bottom of the substrate.

The substrate is ordinarily preheated to enhance adherence of the reaction product. Because prior art molds are complex and exact-fitting, they are placed prior to heating of the substrate. Preheating then raises the temperature of both the substrate and the containment apparatus.

We have invented an apparatus for containing the molten reaction products which includes a refractory-lined inner perimeter situated around that portion of the substrate to be clad, and a larger outer perimeter placed around the inner perimeter and substrate, and forming an annular space with the inner perimeter. This annular space is filled with sand. Unexpectedly, we have found that any molten reaction product, which escapes from the inner perimeter by passing beneath it, solidifies immediately upon coming in contact with the sand forming a barrier to the migration of any additional molten reaction product through the same passage. Our perimeters are emplaced after the substrate has been preheated, and thus are at a lower temperature than the substrate.

It is the primary object of the subject invention to provide an apparatus for containing the molten reaction products of aluminothermic reduction cladding processes on the surface to be clad.

It is another object of our invention to provide a means for halting the migration of any molten reaction product immediately upon its escape from the container apparatus.

It is also an object to provide such apparatus which is readily and inexpensively fabricated.

It is another object to provide such apparatus which is quickly and easily installed and removed.

It is another object to provide a reliable containment apparatus that does not require an exact fit.

It is also an object to provide a reusable containment apparatus.

It is a further object to provide a containment apparatus, installation of which is completed after the substrate is preheated.

It is a still further object to provide an apparatus for preventing carbon pickup by low carbon steels during the reactive cladding process.

These and other objects will become more readily apparent by reference to the following detailed specification and the appended drawing in which.

Figure 1:
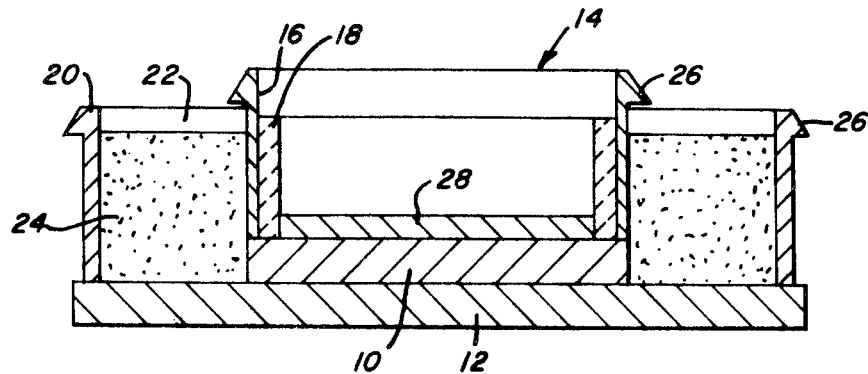
FIG. 1 is a cross-sectioned elevational view of a substrate to be clad, positioned on a steel base, and showing our invented apparatus for containing the molten reaction products.

As shown in FIG. 1, a ferrous metal substrate (10) is preheated, if desired, then placed on a steel base (12). Inner refractory perimeter (14), which may be a bottomless steel box having upstanding sides (16) lined interiorly with graphite plates (18), is placed on the substrate around the portion of the substrate to be clad. Outer perimeter (20) is placed on base (12) around the substrate (10) and the inner perimeter (14), and forms, with the inner perimeter, an annular space (22), which is filled subsequently with sand (24). Lifting members (26) are attached to the perimeters to facilitate their positioning and removal by overhead cranes. The sand provides a movable seal which can flow into any irregularities and fill in any gaps which may exist between the perimeter (14) and the substrate (10). The perimeters can be fabricated to any desired size or shape and still effect a reliable seal for the molten products (28) produced in the reactive cladding process.

Figure 2:
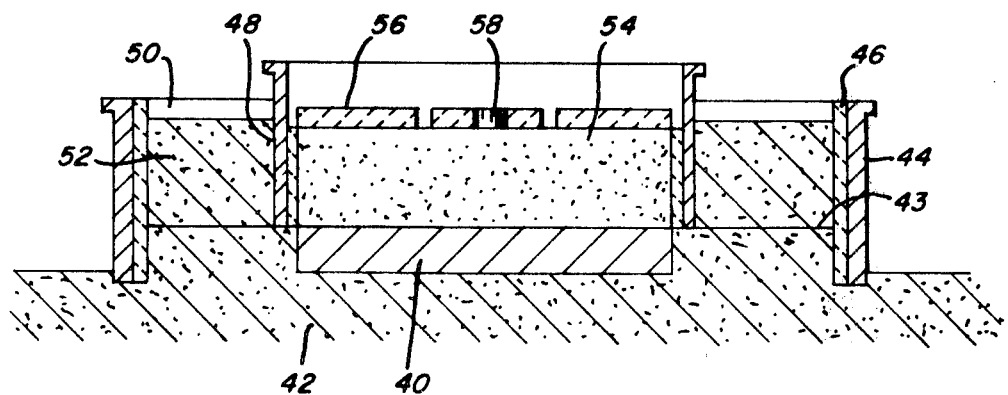
FIG. 2 is a cross-sectioned elevational view similar to FIG. 1, of an alternative embodiment of our invented apparatus, which includes a sand bed rather than a steel base.

In the alternative embodiment of FIG. 2, a cold or preheated ferrous metal substrate (40) rests in a sand bed (42) which has been leveled at line (43) even with the upper surface of the substrate. Outer perimeter (44), which may have a refractory lining (46) if desired, is positioned on the sand bed as shown, prior to leveling the sand. Inner refractory-lined perimeter (48) has interior dimensions identical with the dimension of the substrate (40), thus the perimeter (48) is resting on the sand bed (42) outside the substrate but in extremely close proximity thereto. The inner perimeter (48) forms an annular space (50) with the outer perimeter. This annular space is then filled with sand (52). A powdered exothermic reaction mixture, such as aluminothermic reduction charge (54), is placed on the substrate (40) inside the inner perimeter (44). Charge (54) may be covered by refractory plates (56), such as graphite, if desired, to contain the heat of reaction of the charge and force such heat into the substrate to enhance the adherence of the cladding material. A torch or flare can be inserted through hole (58) to initiate the ATR reaction. The plates (56) also prevent splashing during the reaction.

We have found that the assemblies need not be accurately fitted, i.e., it is unnecessary to machine the bottoms of the perimeters to establish an intimate contact between the perimeter and the base or bed on which it rests. It is also unnecessary to place luting material or caulking around the bottom of the perimeter to form a tight seal. Further, since neither perimeter is preheated along with the substrate, the molten reaction product tends to be chilled as it contacts the relatively cool perimeter.

We have also found that direct contact of the superheated reduced metal product from ATR reactions that take place in containment apparatus having thin graphite walls or thin graphite linings on metal walls resulted in carbon contamination that was unacceptably high for certain grades of stainless steels and thus limited the applicability of the process. Attempts to provide a barrier between the graphite walls and molten metal by coating the walls with refractory materials, such as zirconium silicate and zirconium oxide, were generally unsuccessful.

We have discovered that increasing the thickness of the graphite wall 18 (FIG. 1) dramatically lowers the carbon contamination of the reduced metal phase. During one series of experiments, it was established that increasing the wall thickness from 1 inch to 2 inches reduced the average carbon content of the metal phase by a factor of 3. The exact cause of this mechanism is unknown. The theory of this effect to which we subscribe, but do not wish to be held is as follows:

Immediately after the ATR reaction is completed, the reaction products are in the form of a molten slag phase containing small spheres of the liquid metal phase. Upon contacting the cold graphite wall 18 of our inner perimeter, the high-melting slag-metal phase instantly solidifies to form a thin layer of solid material or skull on the wall surface. If this skull remains intact on the graphite wall, it forms a natural barrier between the reduced metal phase and the graphite wall. However, during the ensuing time required for the bulk of the ATR products to solidify, much of the heat of the reaction is passed into the graphite wall, and the temperature of the wall surface rises precipitously. If this heat is not conducted into an adequate heat sink, the temperature of the skull-coated wall surface an rise to the point where the skull remelts permitting the direct contact of the molten metal with the graphite. Severe carbon contamination of the metal phase can thus result. However, when the graphite wall is sufficiently massive (greater than 2 inches in thickness), the heat is transferred continuously into the bulk of the graphite and the skull temperature does not rise above its melting point. When the skull remains intact, molten metal cannot contact the graphite and carbon contamination is thereby minimized.

To obtain the lowest possible carbon contents, the contacting graphite wall should be as thick as practicable. Experiments indicate that minimum 2-inch thick graphite walls prevents carbon contamination of stainless steels and other low-carbon steels from reaching unacceptable carbon levels. With only a moderate amount of care, these perimeters can be reused many times, thus these perimeters are economically feasible for commercial cladding processes.

It can readily be seen from the foregoing that we have invented a method and apparatus for containing the molten reaction products of an aluminothermic reaction process, which apparatus will prevent material loss from the migration of such molten products onto surfaces from which their removal is time consuming and may be extremely difficult. We have also invented a method and apparatus which will prevent carbon pickup from a graphite-lined mold by low carbon and stainless steels during the reactive cladding process.

We claim:

1. A method for producing an exothermic reduction-deposited metal clad coating on a planar surface of metal substrate, comprising:
    a. supporting the substrate on a bed of a first particulate insulating refractory material extending around the substrate to the plane of the substrate surface to be clad;
    b. forming a metal deposition zone defined by a solid refractory wall enclosing the substrate at the edges thereof and extending to the aforesaid surface plane;
    c. surrounding the metal deposition zone with a second particulate insulating refractory material extending at least to said surface plane and providing a sealing medium flowable into any irregularities between said substrate and said solid wall and containing fluid cladding reaction products escaping therefrom during cladding, and
    d. igniting a particulate exothermic cladding material on the substrate surface to be clad, thereby forming fluid cladding reaction products and cladding said metal substrate.

2. A method in accordance with claim 1, wherein the solid refractory wall is constructed of graphite.

3. A method in accordance with claim 2, wherein said metal substrate is a low-carbon steel and said graphite wall has a thickness of at least about 2 inches, said method reducing carbon contamination of said substrate during cladding thereof.

* * * * *